United States Patent
Brenmiller et al.

(10) Patent No.: US 8,544,273 B2
(45) Date of Patent: Oct. 1, 2013

(54) SOLAR THERMAL POWER PLANT

(75) Inventors: Avraham Brenmiller, Tel Aviv (IL);
Michael Schaal, Kiriat Bialik (IL);
Daniel Yossefi, Omer (IL)

(73) Assignee: Siemens Concentrated Solar Power Ltd., Beit Shemesh (IL)

( * ) Notice: Subject to any disclaimer, the term of this patent is extended or adjusted under 35 U.S.C. 154(b) by 35 days.

(21) Appl. No.: 13/063,793

(22) PCT Filed: Sep. 15, 2009

(86) PCT No.: PCT/IL2009/000899
§ 371 (c)(1),
(2), (4) Date: Aug. 1, 2011

(87) PCT Pub. No.: WO2010/032238
PCT Pub. Date: Mar. 25, 2010

(65) Prior Publication Data
US 2011/0277469 A1   Nov. 17, 2011

Related U.S. Application Data

(60) Provisional application No. 61/136,588, filed on Sep. 17, 2008.

(51) Int. Cl.
*F03G 6/00* (2006.01)
*F01K 13/00* (2006.01)
*F01K 7/34* (2006.01)
*G01K 13/00* (2006.01)
*F25B 27/00* (2006.01)

(52) U.S. Cl.
USPC ............ 60/641.8; 60/645; 60/653; 62/129; 62/235.1

(58) Field of Classification Search
USPC ............ 60/641.8, 641.1, 645, 39.182, 39.33, 60/653, 659; 62/129, 235.1
See application file for complete search history.

(56) References Cited

U.S. PATENT DOCUMENTS

| | | | | |
|---|---|---|---|---|
| 3,799,396 A | * | 3/1974 | Ashmead et al. | 222/1 |
| 3,992,876 A | * | 11/1976 | Aguet | 60/39.12 |

(Continued)

FOREIGN PATENT DOCUMENTS

| | | |
|---|---|---|
| CN | 101413719 A | 4/2009 |
| DE | EP0526816 A1 * | 7/1992 |

(Continued)

OTHER PUBLICATIONS

Machine English Translation of EP 0526816 A1, date: Jul. 1992 containing 7 pages is attached.*

(Continued)

*Primary Examiner* — Thomas Denion
*Assistant Examiner* — Shafiq Mian

(57) ABSTRACT

A solar thermal power plant is provided. The plant includes a steam-electric power plant associated with a steam generation system operationally connected thereto for providing heat to drive its operation, a solar collection system designed to heat thermal fluid and is in communication with the steam-electric power plant to provide heat thereto for driving its operation, and a non-solar power plant including a power generation unit and a waste heat recovery unit. The solar thermal power plant further includes a controller configured to selectively operationally connect the solar collection system and the waste heat recovery unit to the steam-electric power plant to provide heat thereto.

16 Claims, 7 Drawing Sheets

(56) References Cited

U.S. PATENT DOCUMENTS

| | | | |
|---|---|---|---|
| 4,355,514 A * | 10/1982 | Reifenberg | 60/660 |
| 5,269,130 A * | 12/1993 | Finckh et al. | 60/772 |
| 5,417,052 A * | 5/1995 | Bharathan et al. | 60/783 |
| 5,444,972 A * | 8/1995 | Moore | 60/39.182 |
| 5,497,624 A * | 3/1996 | Amir et al. | 60/641.5 |
| 5,806,317 A * | 9/1998 | Kohler et al. | 60/659 |
| 6,141,949 A * | 11/2000 | Steinmann | 60/772 |
| 6,178,734 B1 * | 1/2001 | Shibuya et al. | 60/772 |
| 6,422,022 B2 * | 7/2002 | Gorman et al. | 60/771 |
| 6,572,328 B2 * | 6/2003 | Tremmel et al. | 415/1 |
| 6,691,531 B1 * | 2/2004 | Martinez et al. | 62/612 |
| 6,957,536 B2 * | 10/2005 | Litwin et al. | 60/641.8 |
| 6,996,988 B1 * | 2/2006 | Bussard | 60/641.8 |
| 7,191,597 B2 * | 3/2007 | Goldman | 60/641.8 |
| 2006/0174622 A1 * | 8/2006 | Skowronski | 60/641.8 |
| 2006/0225428 A1 * | 10/2006 | Brostmeyer | 60/772 |
| 2007/0012041 A1 | 1/2007 | Goldman | |

FOREIGN PATENT DOCUMENTS

| | | |
|---|---|---|
| EP | 0526816 A1 | 2/1993 |
| WO | WO 2007074570 A1 | 7/2007 |
| WO | WO 2009034577 A2 | 3/2009 |

OTHER PUBLICATIONS

Bockamp et al., "Solar Thermal Power Generation", Powergen conference, May 6, 2003, pp. 1-22, XP008084267, p. 10-12, figure 4.3.

* cited by examiner

SOLAR THERMAL POWER PLANT

CROSS REFERENCE TO RELATED APPLICATIONS

This application is the US National Stage of International Application No. PCT/IL2009/000899, filed Sep. 15, 2009 and claims the benefit thereof. The International Application claims the benefits of U.S. application Ser. No. 61/136,588 U.S. filed Sep. 17, 2008. All of the applications are incorporated by reference herein in their entirety.

FIELD OF THE INVENTION

This invention relates to solar thermal power plants, and in particular, to solar thermal power plants which provide thermal energy to steam-electric power generating plants.

BACKGROUND OF THE INVENTION

Amid concerns over global warming, and forecasts of both the depletion of non-renewable energy sources and rising power demand, suppliers of energy are increasingly seeking alternative primary sources of energy. One such source of energy is solar energy, and one way of utilizing solar energy is with a solar thermal power plant.

One type of solar power plant utilizes a "radiation concentrator collector" which concentrates the solar radiation by focusing it onto a smaller area, e.g., using mirrored surfaces or lenses. In this system, a reflector, which is typically parabolic, receives and reflects (focuses) incoming solar radiation onto a radiation absorber, which is formed as a tube. The tube radiation absorber is concentrically surrounded by a treated glass enclosure tube to limit the loss of heat. The collector system further includes means to track the sun.

To minimize the loss of heat through convection and conduction and to improve the solar radiation collection efficiency, the space between the tube radiation absorber and the glass enclosure tube is evacuated to very low pressure.

The tube radiation absorber is made of metal with a coating having a high solar radiation absorption coefficient to maximize the energy transfer imparted by the solar radiation reflecting off the reflector. A thermal fluid constituting a heat transport medium, which is typically a liquid such as oil, flows within the tube radiation absorber.

The thermal energy transported by the thermal fluid is then is used to power a steam-electric power plant to drive one or more turbines thereof, in order to generate electricity in a conventional way, e.g., by coupling the axle of each of the turbines to an electric generator.

SUMMARY OF THE INVENTION

According to one aspect of the present invention, there is provided a solar thermal power plant comprising:

a steam-electric power plant being associated with at least one steam generation system operationally connected thereto for providing heat to drive its operation;

a solar collection system designed to heat thermal fluid and being in communication with the steam-electric power plant to provide heat thereto for driving its operation; and a non-solar power plant comprising a power generation unit and a waste heat recovery unit;

the solar thermal power plant further comprising a controller configured to selectively operationally connect each of the solar collection system and the waste heat recovery unit to the steam-electric power plant to provide heat thereto.

The steam-electric power plant may be configured to selectively at least partially divert working fluid thereof from at least one steam division junction thereof, to the waste heat recovery unit for heating thereby, and reintroduced thereto at a corresponding steam union junction thereof.

It will be noted that term "steam" when used herein refers to working fluid of the steam-electric plant in general, and may refer as well to non-gaseous (i.e., liquid) states of water or working fluid, and should not be construed as referring to steam specifically, unless made otherwise clear from the context.

The steam-electric power plant may further comprise a working fluid circuit designed for carrying the working fluid therethrough sequentially through the steam generation system, a first turbine, a second turbine operating at a lower pressure than the first turbine, and returning to the steam generation system, wherein:

a first of the steam division junctions is located downstream of the second turbine and upstream of the steam generation system; and a first of the steam union junctions, corresponding to the first steam division junction, is located downstream of the steam generation system and upstream of the first turbine.

The solar thermal power plant may be configured to selectively operate in at least one of a direct solar mode or a direct non-solar mode, or in a combination thereof, wherein:

in the direct solar mode the first steam division junction operates to allow working fluid flow between the second turbine and the steam generation system, and the first steam union junction operates to allow working fluid flow between the steam generation system and the first turbine; and in the direct non-solar mode, the first steam division junction operates to allow working fluid flow between the second turbine and the waste heat recovery unit, and the first steam union junction operates to allow working fluid flow between the waste heat recovery unit and the first turbine.

The solar thermal power plant may be configured to operate in the direct solar mode and the direct non-solar mode simultaneously.

The solar thermal power plant may be designed such that:

a second of the steam division junctions is located downstream of the first turbine and upstream of the second turbine; and a second of the steam union junctions, corresponding to the second steam division junction, is located downstream of the steam division junction and upstream of the second turbine.

In such a case:

in the direct solar mode, the second steam division junction and second steam union junction operate to allow working fluid flow between the first turbine and the second turbine; and in the direct non-solar mode, the second steam division junction operates to allow working fluid flow between the first turbine and the waste heat recovery unit, and the second steam union junction operates to allow working fluid flow between the waste heat recovery unit and the second turbine.

The steam generation system may comprise a reheater located within the working fluid circuit downstream of the first turbine and upstream of the second turbine, the reheater being located downstream of the second steam division junction and upstream of the second steam union junction.

The solar thermal power plant may further comprise a plurality of feedwater heaters located within the working fluid circuit downstream of the second turbine and upstream of the steam generation system, the first steam division junction being located upstream of the feedwater heaters.

The solar thermal power plant may be configured to selectively at least partially divert thermal fluid thereof from at least one oil division junction thereof between the solar collection system and the steam-electric power plant, to a corresponding alternate heat source for heating of the thermal fluid, and subsequently reintroduced thereto at a corresponding oil union junction between the solar collection system and the steam-electric power plant.

It will be noted that term "oil" when used herein refers to thermal fluid in general, and should not be construed as referring to thermal oil specifically, unless made otherwise clear from the context. In addition, when working fluid is being heated in the solar collection system or in the waste heat recovery unit in a direct steam generation operation, the term "oil", as well as "thermal fluid", refers as well the working fluid of the steam-electric power plant.

A first of the oil division junctions may be located downstream of the steam-electric power plant and upstream of the solar collection system, with a first of the oil union junctions, corresponding to the first oil division junction, located downstream of the solar collection system and upstream of the steam-electric power plant; the corresponding alternate heat source being the waste heat recovery unit.

The solar thermal power plant may be configured to selectively operate in a non-solar heating mode, wherein the first oil division junction operates to allow thermal fluid flow between the steam-electric power plant and the waste heat recovery unit, and the first oil union junction operates to allow working fluid flow between the waste heat recovery unit and the steam-electric power plant.

Each of at least some of the junctions may be defined by a three-way valve.

The solar collection system may further comprise a heat storage/discharge system configured for storing therein at least a portion of heat captured by the solar collection system, the controller being further configured to selectively operationally connect the heat storage/discharge system to the steam-electric power plant to provide heat thereto.

A second of the oil division junctions may be located downstream of the steam-electric power plant and upstream of the solar collection system, with a second of the oil union junctions, corresponding to the second oil division junction, being located downstream of the solar collection system and upstream of the steam-electric power plant; the corresponding alternate heat source being the heat storage/discharge system.

The solar thermal power plant may be configured to selectively operate in at least one of a primary solar heating mode or a secondary solar heating mode, or in a combination thereof, wherein:

in the primary solar heating mode, the second oil division junction operates to allow working fluid flow between the steam-electric power plant and the solar collection system, and the second oil union junction operates to allow working fluid flow between the solar collection system and the steam-electric power plant; and in the secondary solar heating mode, the second oil division junction operates to allow thermal fluid flow between the steam-electric power plant and the heat storage/discharge system, and the second oil union junction operates to allow working fluid flow between the heat storage/discharge system and the steam-electric power plant.

The solar thermal power plant may be configured to operate in the primary and secondary solar heating modes simultaneously. In addition, it may be configured to operate simultaneously in the non-solar heating mode and in at least one of the primary and secondary solar heating modes, or in a combination thereof.

The solar collection system may comprise a primary solar field for operational connection to the steam-electric power plant to supply heat thereto, and a secondary solar field for operational connection to the heat storage/discharge system to supply heat thereto. Alternatively, the solar collection system may comprise a solar field configured to be selectively operationally connected to the steam-electric power plant and/or the heat storage/discharge system to supply heat thereto.

The solar collection system may constitute one of the steam generation systems, wherein working fluid of the steam-electric power plant constitutes the thermal fluid. For example, the power plant may operate according to a direct steam generation design, wherein working fluid of the steam-electric power plant is heated and vaporized within the tubes of the solar collection system. In addition, the waste heat recovery unit may constitute one of the steam generation systems.

The steam generation system comprises heat exchangers configured to heat working fluid of the steam-electric power plant with thermal fluid heated within at least one of the solar collection system and the waste heat recovery unit. In this case, the solar collection system and waste heat recovery unit are operationally connected to the steam-electric power plant to provide heat thereto via the steam generation plant, i.e., they provide heat to the steam-electric power plant by heating thermal fluid, which heats the working fluid of the steam-electric power plant within the heat exchangers.

The steam-electric power plant may comprise one or more feedwater heaters, the controller being further configured for operating the steam-electric power plant with at least some of the feedwater heaters bypassed. This enables the steam-electric power plant to operate at a reduced capacity or load, for example between about 25%-50% capacity.

The non-solar power plant may comprise a gas-turbine power plant. The controller may be configured for operating the gas-turbine power plant and concurrently operating the steam-electric power plant, with waste heat from the gas-turbine power plant, at approximately 20%-30% capacity.

BRIEF DESCRIPTION OF THE DRAWINGS

In order to understand the invention and to see how it may be carried out in practice, embodiments will now be described, by way of non-limiting examples only, with reference to the accompanying drawings, in which.

DETAILED DESCRIPTION

Figure 1A:
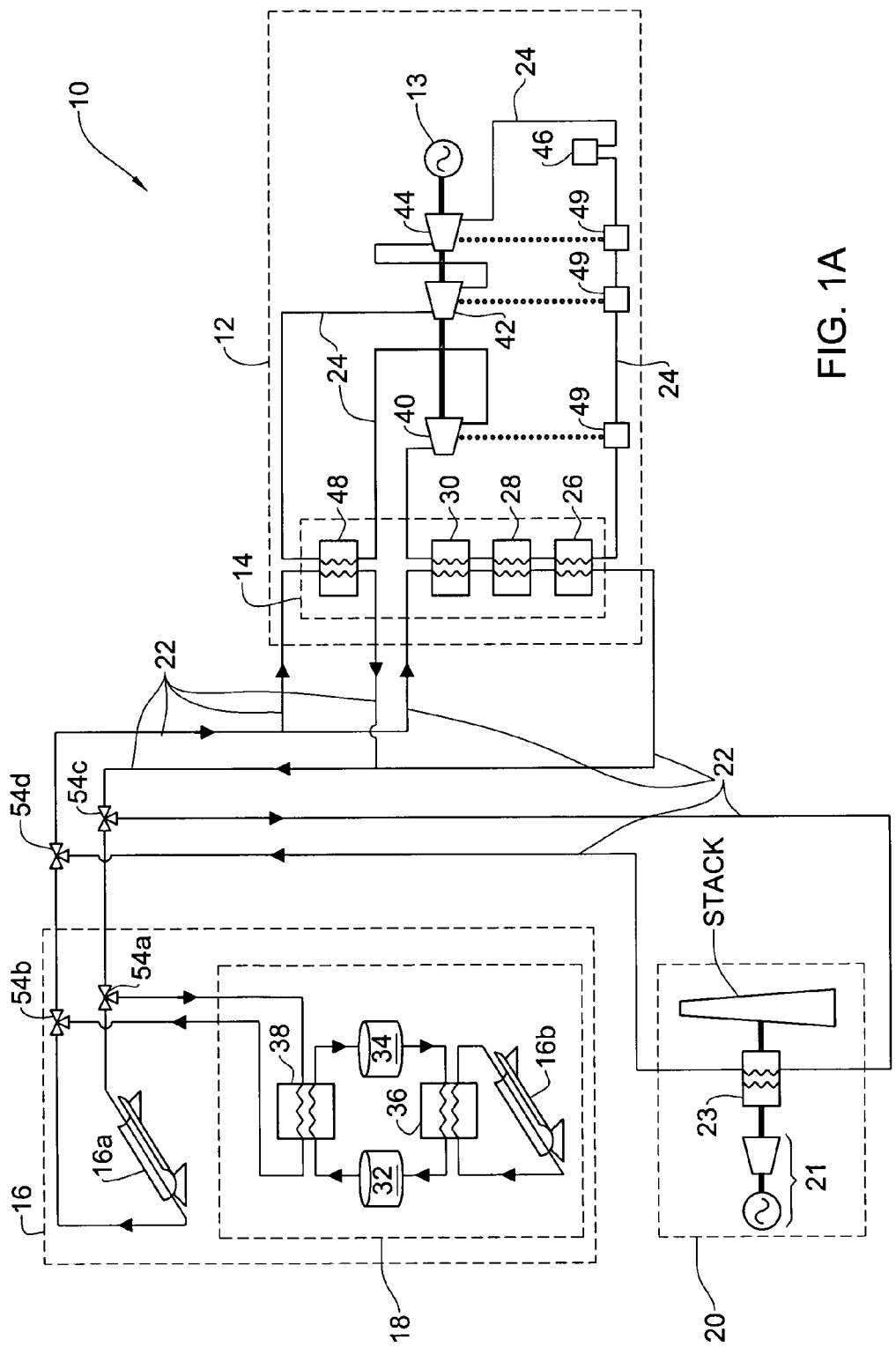
FIG. 1A is a schematic illustration of main components of one example of a solar thermal power plant according to the present invention.

As illustrated schematically in FIG. 1A, there is provided one example of a solar thermal power plant, which is generally indicated at 10. The power plant 10 comprises several systems, including a steam-electric power plant 12 with a steam generation system 14, a solar collection system 16 with an optional heat storage/discharge system 18, and non-solar power plant 20. The plant further comprises a network of pipes, some of which constitute oil lines 22 for carrying thermal fluid, and some of which constitute steam lines 24, for carrying steam and/or water within the steam-electric power plant 12. It will be appreciated that portions of these pipes are common to two or more of the above systems. The thermal fluid is used to heat the steam/water within the steam generation system 14 to provide a heat source for the steam-electric power plant 12.

The several systems of the power plant 10 are connected to one another via the pipes, as follows:

the various elements of the steam-electric power plant 12, including the steam generation system 14, are connected to one another via steam lines 24 constituting a working fluid circuit;

the steam generation system 14 is connected to the solar collection system 16 via oil lines 22;

the steam generation system 14 is connected to the non-solar power plant 20 via oil lines 22; and the various elements of the solar collection system 16, including the optional heat storage/discharge system 18, are connected to one another via oil lines.

The steam-electric power plant 12 comprises elements which are typically found within such a plant and which are well-known, such as a high pressure turbine 40, a intermediate pressure turbine 42, a low pressure turbine 44, a condenser 46, feedwater heaters 49, pumps, etc. (only some of which are illustrated; in addition, it will be appreciated that while each turbine is illustrated as being connected to one feedwater heater, this is for illustrative purposes only, and several feedwater heaters may be provided connected to each turbine). The various elements are connected to one another by steam lines 24. In addition, the turbines 40, 42, 44 of the steam-electric power plant 12 are coupled to an electrical generator 13 for generating electricity, as is well known. The steam-electric power plant 12 may be designed in accordance with that described in WO 2009/034577, filed on Sep. 11, 2008, to the present applicant, the disclosure of which is incorporated herein by reference.

The steam generation system 14 comprises a steam generation train, and comprises three heat exchangers, so that the working fluid can reach the elevated temperature and pressure required to optimally drive the turbines of the steam-electric power plant: a pre-heater 26, an evaporator 28, and a super-heater 30. The thermal fluid from the oil lines 22 is used to heat the steam/water in the steam lines 24. It may further comprise an optional reheater 48.

The steam-electric power plant 12 and steam generation system 14 may be designed in accordance with that described in WO 2009/034577, filed on Sep. 11, 2008, to the present applicant.

The solar collection system 16 comprises a primary solar field 16a, which is configured to capture heat from sunlight impinging thereon and carry it to the steam generation system 14. The optional heat storage/discharge system 18 comprises a secondary solar field 16b, which is configured to capture heat from sunlight impinging thereon and carry it to the heat storage/discharge system. Each of the primary and secondary solar fields 16a, 16b comprises one or more tube radiation absorbers and a plurality of trough collectors, such as single-axis parabolic reflectors. Alternatively, any suitable means for concentrating solar radiation, such as Fresnel collectors, may be provided. The tubes, including those which are not exposed to solar radiation, constitute a heating circuit of the power plant 10. The tube radiation absorbers contain a thermal fluid therein, such as oil (phenyls) which are commercially available, such as under the trade name Therminol® VP-1, Dowtherm™, etc. According to different embodiments, the thermal fluid may also be one of steam/water, molten salts, carbon dioxide, and helium. The thermal fluid, according to any of the embodiments, is heated within the tubes upon their exposure to direct and concentrated solar radiation. Thus, the thermal fluid is heated as it flows through the tube radiation absorbers. Reflectors, such as parabolic reflectors, may be provided in order to further heat the thermal fluid, as is well known in the art. Solar collection systems of this type are provided, inter alia, by Solel Solar Systems, Ltd. (Israel).

The optional heat storage/discharge system 18 is used to store heat which is captured by its secondary solar field 16b. As such, it comprises a hot heat storage tank 32, a cold heat storage tank 34, an input heat exchanger 36, and an output heat exchanger 38. The storage tanks comprise a heat storage material, such as molten salts or any other appropriate material which can substantially store heat within its tank for the required period. The input heat exchanger 36 is configured to use captured heat from the secondary solar field 16b to heat the heat storage material as it passes from the cold heat storage tank 34 to the hot heat storage tank 32, and to draw heat, to heat thermal fluid for use in the steam generation system 14, from the heat storage material as it passes from the hot heat storage tank 32 to the cold heat storage tank 34.

The non-solar power plant 20 comprises a power generation unit 21 and a waste-heat recovery unit 23 configured to capture the waste heat of the gas turbine and utilize it to heat working fluid of the steam-electric power plant 12. The non-solar power plant 20 may be a combined cycle gas-turbine power plant, wherein the power generation unit 21 is a gas turbine. The waste-heat recovery unit 23 may comprise appropriate heat exchangers. In this example, the waste heat is used to heat thermal fluid within the oil lines 22, which is subsequently used to heat steam/water within the steam generation system 14. According to a modification, the waste heat from the non-solar power plant 20 may be selectively stored in the heat storage/discharge system 18, or in an additional optional heat storage/discharge system (not illustrated) intended for this purpose. It will be appreciated that appropriate oil lines and controls are provided in order to implement the modification. It will be further appreciated that the non-solar power plant 20 may be replaced by any similar plant which is configured to generate power and capture waste heat, without departing from the spirit and the scope of the present invention. Non-limiting examples are plants which are powered by natural gas, fossil fuels, biomass, etc.

In addition, the heat recovery unit 23 may be designed to heat steam from the power plant directly, for example as a "booster". For example, steam exiting the super-heater 30 may be diverted to the heat recovery unit 23 for additional heating there, in order to increase the working temperature of the high pressure turbine 40. Additionally or alternatively thereto, steam exiting the reheater 48 may be may be diverted to the heat recovery unit 23 for additional heating there, in order to increase the working temperature of the medium pressure turbine 42.

The power plant 10 is further provided with first and second oil division junctions 54a, 54c and corresponding first and second oil union junctions 54b, 54c, for redirecting the thermal fluid flowing within oil lines 22 between the steam-electric power plant 112 on the one hand, and the solar collection system 16 and elements thereof, and the non-solar power plant 20 on the other hand.

The oil division junctions 54a, 54c are located within the oil lines 22, and function as points of divergence of thermal fluid flowing therein. They may each comprise a three-way valve which is configured to selectively divert thermal fluid in one of two direction (in the case of first oil division junction 54a, either to the primary solar field 16a or the heat storage/discharge system 18; in the case of second oil division junction 54c, either to the solar collection system 16 or the non-solar power plant 20), or any other suitable arrangement, including a system of valves or other suitable elements. The junctions may be further configured to partially divert thermal fluid between the two directions. For example, 50% of the thermal fluid may be diverted in one direction, and 50% in the other direction, or any other suitable division.

The oil union junctions 54b, 54d are located within the oil lines 22, and are each located to reintroduce, at an appropriate location, thermal fluid which had been diverted by its corresponding oil division junction 54a, 54c. They may be further configured to prevent backflow of thermal fluid.

First and second oil division junctions 54a, 54c are located, respectively, downstream of the steam generation system 14 and upstream of the primary solar field 16a, and corresponding first and second oil union junctions 54b, 54d are located, respectively, downstream of the primary solar field and upstream of the steam generation system.

The first oil division junction 54a and first oil union junction 54b are connected to oil lines which flow through the output heat exchanger 38 of the heat storage/discharge system 18. They are configured to selectively direct flow of thermal fluid between the steam generation system 14 and either the primary solar field 16a or the heat storage/discharge system 18.

The second oil division junction 54c and second oil union junction 54d are connected to oil lines which flow through the waste-heat recovery unit 23 of the non-solar power plant 20. They are configured to selectively direct flow of thermal fluid between the steam generation system 14 and either the solar collection system 16 or the non-solar power plant 20.

A controller (not illustrated) is provided to coordinate the operation of the junctions, as well as the other equipment of the power plant 10.

Each of the above systems may be provided with the required sensors, meters, etc. In this way, it is possible to track how much of the power generated by the power plant 10 has been provided by each of the several systems. This may be useful, for example, in demonstrating compliance with local regulations, analyzing costs, gathering detailed usage data, etc.

Figure 1B:
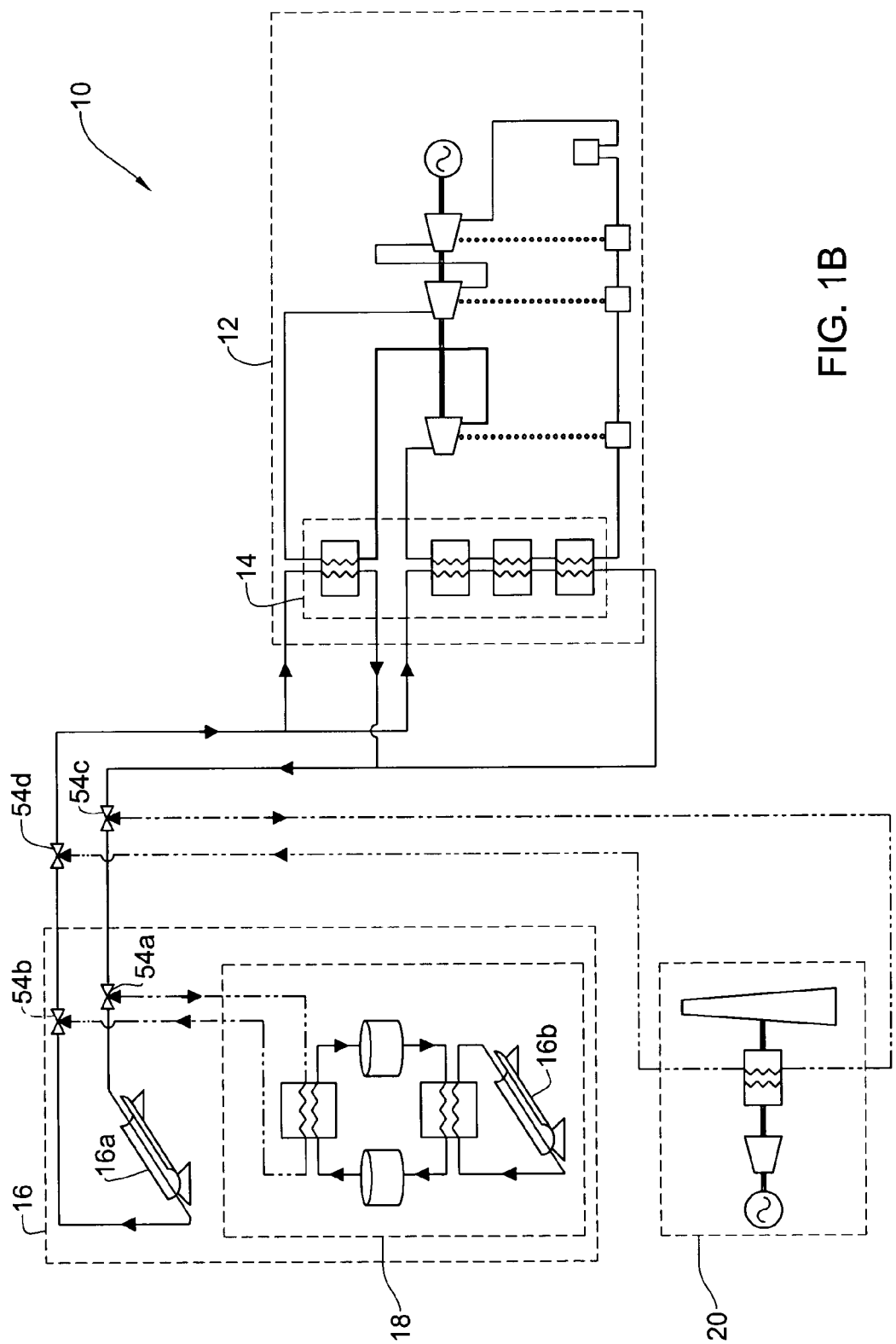
FIG. 1B is a schematic illustration of the solar thermal power plant illustrated in FIG. 1A, in a primary solar heating mode thereof.
Figure 1C:
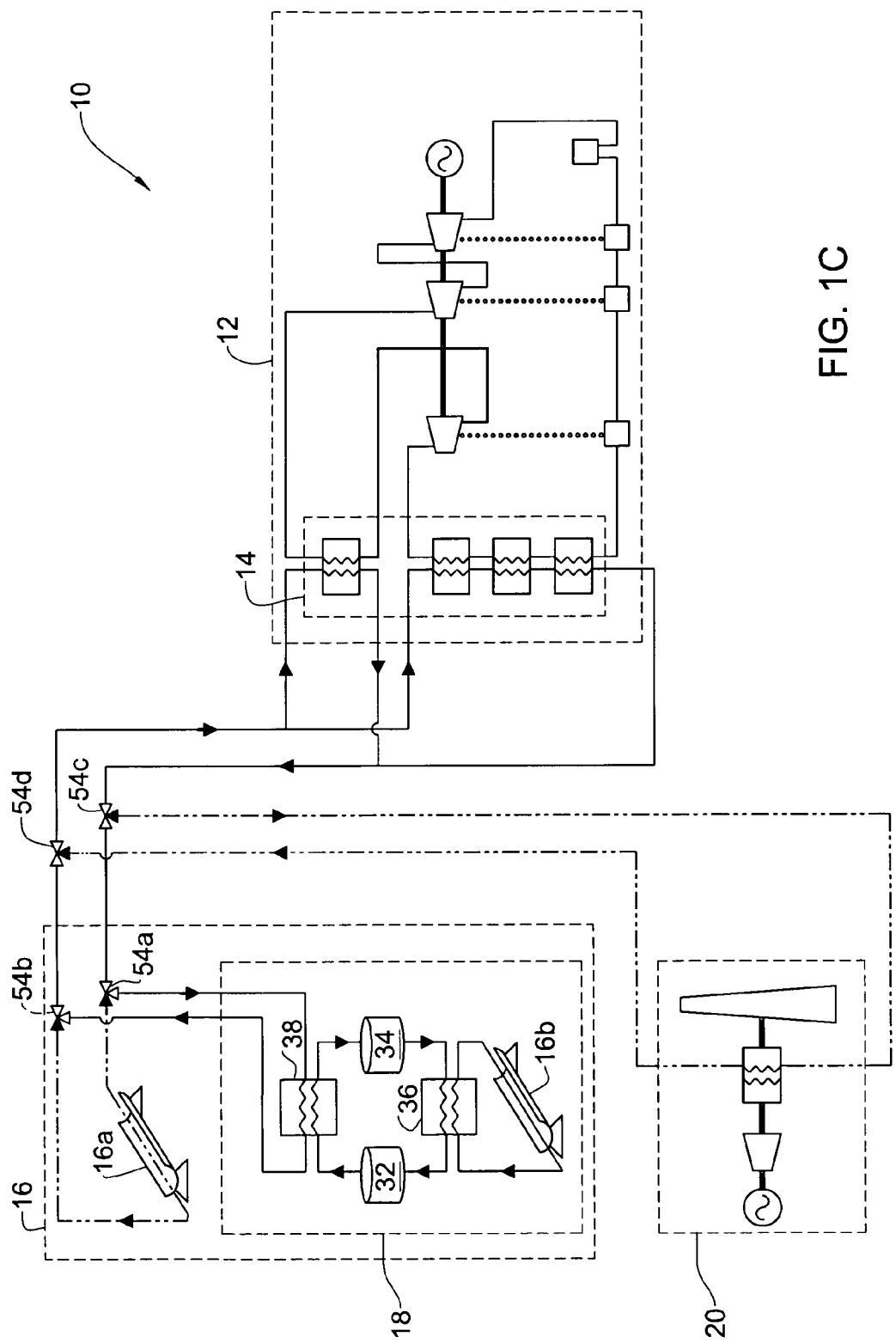
FIG. 1C is a schematic illustration of the solar thermal power plant illustrated in FIG. 1A, in a secondary solar heating mode thereof.
Figure 1D:
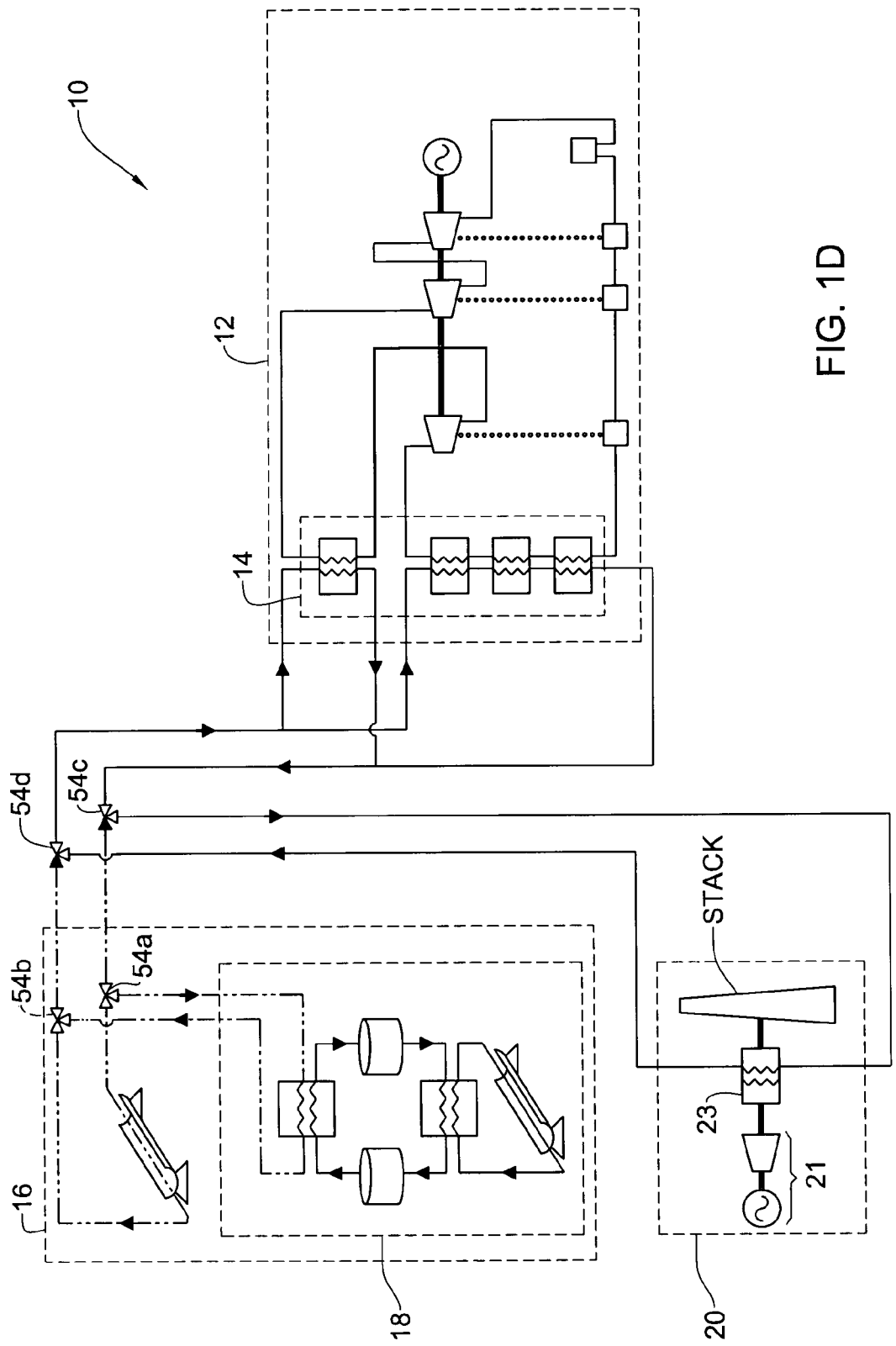
FIG. 1D is a schematic illustration of the solar thermal power plant illustrated in FIG. 1A, in a non-solar heating mode thereof.

The power plant 10 is configured to operate in several modes:

primary solar heating mode, in which the heat captured by the primary solar field 16a is utilized to heat the steam/water within the steam generation system 14 to power the steam-electric power plant 12; in addition, heat captured by the secondary solar field 16b is stored in the hot heat storage tank 32 of the optional heat storage/discharge system 18; in this mode, as illustrated in FIG. 1B, all of the oil division and oil union junctions 54a, 54b, 54c, 54d are operational to allow thermal fluid to flow between the steam generation system 14 and the solar collection system 16 (the operational state of each junction is indicated by the triangles in the figures—an unfilled triangle indicates an open direction of flow, and a filled triangle indicates a blocked direction of flow; blocked lines of flow are indicated as dotted lines);

secondary solar heating mode, in which heat which had been captured by the secondary solar field 16b and subsequently stored in the hot heat storage tank 32 of the optional heat storage/discharge system 18 is released and is utilized to heat the steam/water within the steam generation system 14 to power the steam-electric power plant 12; in this mode, as illustrated in FIG. 1C, the second oil division and oil union junctions 54c, 54d are operational to allow thermal fluid to flow between the steam generation system 14 and the solar collection system 16, and the first oil division and oil union junctions 54a, 54b are operational to divert thermal fluid to the heat storage/discharge system 18; and non-solar heating mode, in which the non-solar power plant 20 is functioning to provide power, both directly, e.g., by the gas turbine 21 thereof, and by utilizing the recovered waste heat of the gas turbine to heat the steam/water within the steam generation system 14 to power the steam-electric power plant 12; in this mode, as illustrated in FIG. 1D, the second oil division and oil union junctions 54c, 54d are operational to allow thermal fluid to flow between the steam generation system 14 and the non-solar power plant 20, and the first and second three-way valves 54a, 54b may be open in any position. During this mode, the steam-electric power plant 12 may work at a partial load (i.e., with at least some feedwater heaters bypassed), such as approximately 20%-30% of its maximum capacity, or any other appropriate amount.

The above modes are presented with each oil division junction 54a, 54c operational to fully divert thermal fluid. However, it will be appreciated that they may be operational to only partially divert fluid as described above, leading to "hybrid" modes, wherein the power plant 10 operates in two or more modes simultaneously. For example, the first oil division junction 54a may be operational to divert some thermal fluid to the primary solar field 16a and some to the heat storage/discharge system 18, resulting in a hybrid primary/secondary solar heating mode. In addition, the second oil division junction 54c may be operational to divert some thermal fluid from the steam generation system 14 to the non-solar power plant 20, and some to the solar collection system 16, resulting in either a hybrid primary solar/non-solar heating mode, a hybrid secondary solar/non-solar heating mode, or a hybrid primary/secondary solar/non-solar heating mode. In the latter case, for example, the second oil division junction 54c may be operative to divert 50% of the thermal fluid to the non-solar power plant 20, and 50% to the solar collection system 16; the first oil division junction 54a may be operative to divert half of the thermal fluid entering the solar collection system, i.e., 25% of the total thermal fluid, to the primary solar field 16a for heating therein, and 25% of the total thermal fluid to the heat storage/discharge system 18 for heating therein.

In the summer, the power plant 10 may be operated as follows: the primary and secondary solar fields 16a, 16b are operative during the daytime to capture heat from sunlight impinging thereupon and, respectively, power the steam-electric power plant 12 in the primary solar heating mode, and store heat in the optional heat storage/discharge system 18 for use in the secondary solar heating mode. In the evening, the heat in the optional heat storage/discharge system 18 is discharged and powers the steam-electric power plant 12 in the secondary solar heating mode. At night, if necessary, the non-solar power plant 20 is operative in the non-solar heating mode as described above.

According to one example, in the primary solar heating mode, the primary solar field 16a captures about 465 MW$_{th}$ of solar heat, and powers the steam-electric power plant 12 to produce 173 MW of electricity. At the same time, the secondary solar field 16b captures about 470 MW$_{th}$ of solar heat, and stores it in the optional heat storage/discharge system 18. In the secondary solar heating mode, the 470 MW$_{th}$ of heat in the heat storage unit 18 is used to power the steam-electric power plant 12 to produce 173 MW of electricity. In the non-solar heating mode, the non-solar power plant 20 is operated to generate 143 MW of electricity using 359 MW of, e.g., natural gas. The waste heat is recovered, and is used to power the steam-electric power plant 12 to produce an additional 32 MW of electricity (for a total of 175 MW of electricity in the combined cycle). When the power plant 10 is operating in its non-solar heating mode, high-pressure feedwater heaters may be bypassed (i.e., the extractions flowrates are zero). This is summarized in Table 1:

TABLE 1

| Mode | Primary Solar Field 16a (captured/ discharged) | Secondary Solar Field 16b (captured/ discharged) | Steam Turbine (produced) | Non-Solar Power Plant (fuel input/ produced) |
|---|---|---|---|---|
| Primary Solar Heating Mode | 465 MW$_{th}$/ 465 MW$_{th}$ | 470 MW$_{th}$/0 | 173 MW | — |
| Secondary Solar Heating Mode | — | 0/470 MW$_{th}$ | 173 MW | — |
| Non-Solar Heating Mode | — | — | 32 MW | 359 MW/ 143 MW |

In addition, the non-solar power plant 20 could be operative on an as-needed basis, i.e., as a "peaker plant", even when power plant 10 is operative in the primary solar heating mode, in order to provide extra power, for example during peak-load times, e.g., daytime peak-load times.

In the winter, the power plant 10 may be operated by use of the non-solar power plant 20, with waste heat being utilized to heat the steam/water within the steam generation system 14 to power the steam-electric power plant 12. According to the modification presented above, the waste heat may be selectively utilized to heat the steam/water within the steam generation system 14 to power the steam-electric power plant 12, or it may be stored in the optional heat storage/discharge system 18 for later use.

During the autumn and spring, when the weather and demand may vary on a weekly or daily basis, the operation of the several systems of the power plant 10 may be controlled based on expected short-term demand and weather conditions.

The gross efficiencies of the different modes may be about 38.6% for solar power, and close to or about 50% for the non-solar power plant operating in the combined cycle. Overall on annual basis, about 20%-60% of the supply may be from gas (such as natural gas), and about 40%-80% may be from solar, depending on grid demand and operation policy of the power plant 10. Thus, electricity can be supplied as needed, while maintaining overall high efficiencies for the power plant 10.

Figure 2A:
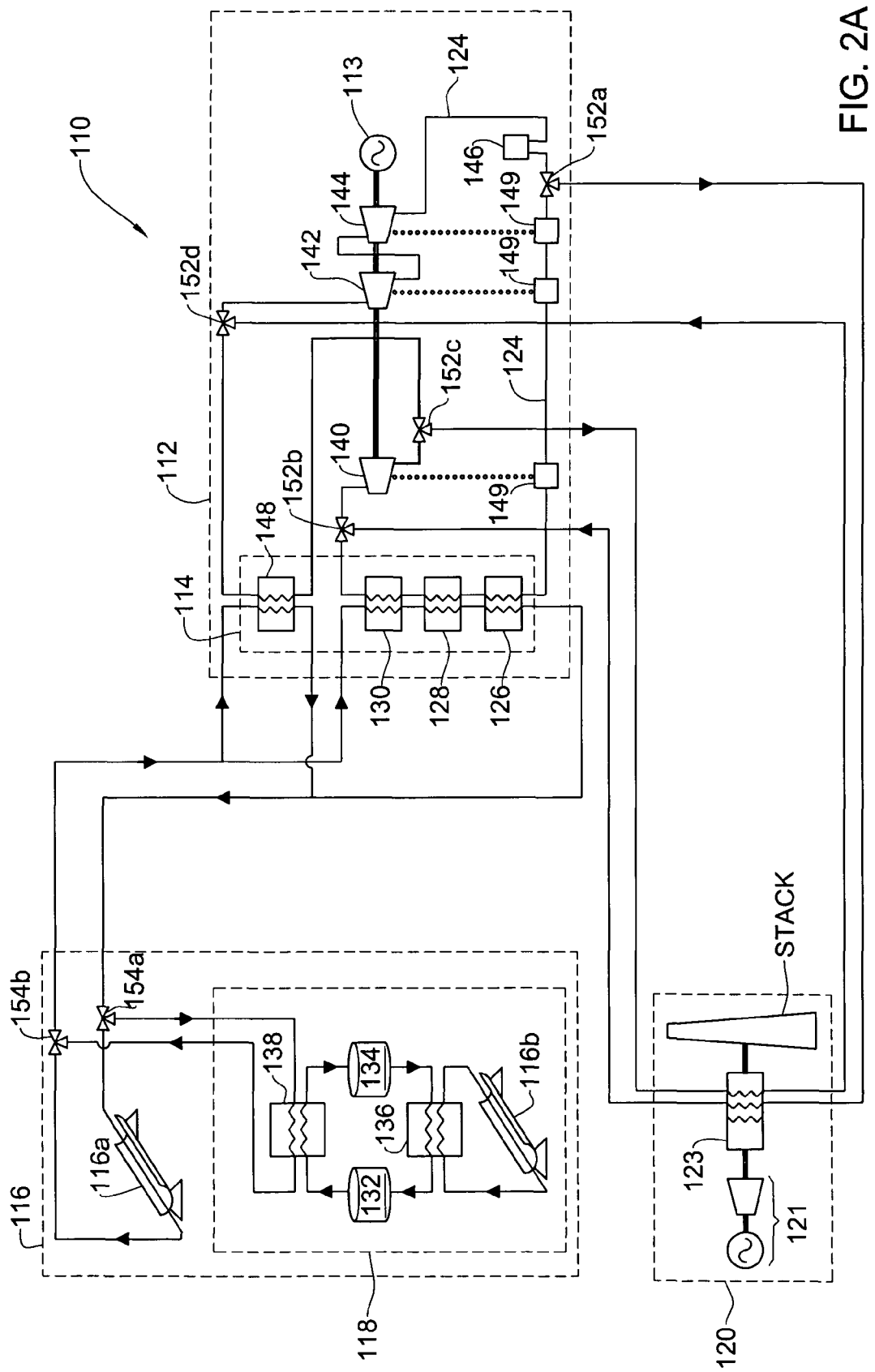
FIG. 2A is a schematic illustration of main components of another example of a solar thermal power plant according to the present invention.

As illustrated schematically in FIG. 2A, there is provided another example of a solar thermal power plant, which is generally indicated at 110 (it will be appreciated that elements in the plant 110 which correspond to those of plant 10, described above with reference to FIGS. 1A through 1D, have been designated with corresponding reference numerals, but increased by 100). The power plant 110 comprises systems similar to those described with reference to plant 10, i.e., a steam-electric power plant 112 with a steam generation system 114, a solar collection system 116 with an optional heat storage/discharge system 118, and a non-solar power plant 120. The plant further comprises a network of pipes similar to that of plant 10, including oil lines 122 for carrying thermal fluid, and steam lines 124.

The several systems of the power plant 110 are connected to one another via the pipes, as follows:

the various elements of the steam-electric power plant 112, including the steam generation system 114, are connected to one another via steam lines 124 constituting a working fluid circuit;

the steam generation system 114 is connected to the solar collection system 116 via oil lines 122;

the non-solar power plant 120 is connected to various points between the turbines of the steam-electric power plant 112 via steam lines 124, as will be described below; and the various elements of the solar collection system 116, including the optional heat storage/discharge system 118, are connected to one another via oil lines.

The steam-electric power plant 112 comprises elements which are typically found within such a plant and which are well-known, such as a high pressure turbine 140, an intermediate pressure turbine 142, a low pressure turbine 144, a condenser 146, feedwater heaters 149, pumps, etc. (only some of which are illustrated; in addition, it will be appreciated that while each turbine is illustrated as being connected to one feedwater heater, this is for illustrative purposes only, and several feedwater heaters may be provided connected to each turbine). In addition, the turbines of the steam-electric power plant 112 are coupled to an electrical generator 113 for generating electricity, as is well known.

The steam generation system 114 comprises a steam generation train, and comprises three heat exchangers, so that the working fluid can reach the elevated temperature and pressure required to optimally drive the turbines of the steam-electric power plant: a pre-heater 126, an evaporator 128, and a super-heater 130. The thermal fluid from the oil lines 122 is used to heat the steam/water in the steam lines 124. It may further comprise an optional reheater 148.

The steam-electric power plant 112 and steam generation system 114 may be designed in accordance with that described in WO 2009/034577, filed on Sep. 11, 2008, to the present applicant.

The solar collection system 116 is designed similarly to its counterpart described above with reference to solar collection system 16, mutatis mutandis.

The optional heat storage/discharge system 118 is used to store heat which is captured by its secondary solar field 116b. As such, it comprises a hot heat storage tank 132, a cold heat storage tank 134, an input heat exchanger 136, and an output heat exchanger 138, each being similar to its counterpart described above with reference to heat storage/discharge system 18.

The non-solar power plant 120 comprises a power generation unit 121 and a waste-heat recovery unit 123 configured to capture the waste heat of the gas turbine and utilize it to heat working fluid of the steam-electric power plant 112. The non-solar power plant 121 may be a combined cycle gas-turbine power plant, wherein the power generation unit 121 is a gas turbine. The waste-heat recovery unit 123 may comprise appropriate heat exchangers. In this example, the waste heat is used to heat water/steam which within the steam lines 124, which had been drawn from one or more points of the working fluid circuit, and is subsequently reintroduced thereto at one or points. Thus, the waste-heat recovery unit 123 serves to directly supplement the steam generation system 114. It will be appreciated that the non-solar power plant 120 may be replaced by any similar plant which is configured to generate power and capture waste heat, without departing from the spirit and the scope of the present invention. Non-limiting examples are plants which are powered by natural gas, fossil fuels, biomass, etc.

In addition, the heat recovery unit 123 may be designed to heat steam from the power plant, for example as a "booster". For example, steam exiting the super-heater 130 may be diverted to the heat recovery unit 123 for additional heating there, in order to increase the working temperature of the high pressure turbine 140. Additionally or alternatively thereto, steam exiting the reheater 148 may be may be diverted to the heat recovery unit 123 for additional heating there, in order to increase the working temperature of the medium pressure turbine 142.

The power plant 110 is further provided with first oil division and oil union junctions 154a, 154, designed similarly to its counterpart described above with reference to power plant 10, mutatis mutandis.

The steam-electric power plant 112 is further provided with first and second steam division junctions 152a, 152c and corresponding first and second oil union junctions 152b, 152c, for redirecting the working fluid flowing within the working fluid circuit of the steam-electric power plant to the waste-heat recovery unit 123 of the non-solar power plant 120, and for reintroducing thereto at appropriate locations.

The stream division junctions 152a, 152c are located within the steam lines 24 of the steam-electric power plant 112, and function as points of divergence of working fluid flowing therein. They may each comprise a three-way valve which is configured to selectively divert thermal fluid in one of two direction (either to the waste-heat recovery unit 123 of the non-solar power plant 120 or downstream within the working fluid circuit), or any other suitable arrangement, including a system of valves or other suitable elements. The junctions may be further configured to partially divert working fluid between the two directions. For example, 50% of the working fluid may be diverted in one direction, and 50% in the other direction, or any other suitable division.

The water/steam from the steam-electric power plant 112 may be redirected from a point immediately downstream of the condenser 146, i.e., upstream of the adjacent feedwater heater, by the first steam division junction 152a. The redirected water/steam is introduced into the waste-heat recovery system 123 of the non-solar power plant 120, where it is heated using the waste heat of the gas turbine 121. The heated water/steam is reintroduced to the steam-electric power plant 112, for example at a point immediately downstream of the super-heater 130, i.e., upstream of the high pressure turbine 140, by the first steam union junction 152b.

In addition, water/steam from the steam-electric power plant 112 may be redirected from a point immediately downstream of the high pressure turbine 140, i.e., upstream of the reheater 148 (if no reheater is included, this point may be upstream of the intermediate pressure turbine 142), by the second steam division junction 152c. The redirected water/steam is introduced into the waste-heat recovery system 123 of the non-solar power plant 120, where it is heated using the waste heat of the gas turbine 121. The heated water/steam is reintroduced to the steam-electric power plant 112, for example at a point immediately downstream of the reheater 148 (if no reheater is included, this point may be immediately downstream of the high pressure turbine 140), i.e., upstream of the intermediate pressure turbine 142, by the second steam union junction 152d.

It will be appreciated that the first steam division junction 152a is connected downstream of the condenser 146, and upstream of the adjacent feedwater heater and of the waste-heat recovery system 123. It can be selectively adjusted to connect the condenser 146 to its adjacent feedwater heater, or to connect the condenser to the waste-heat recovery system 123.

The first steam union junction 152b is connected downstream of the super-heater 130 and of the waste-heat recovery system 123, and upstream of the high pressure turbine 140. It can be selectively adjusted to connect the super-heater 130 to the high pressure turbine 140, or to connect the waste-heat recovery system 123 to the high pressure turbine 140.

The second steam division junction 152c is connected downstream of the high pressure turbine 140, and upstream of the upstream of the reheater 148 (or of the intermediate pressure turbine 142) and of the waste-heat recovery system 123. It can be selectively adjusted to connect the high pressure turbine 140 to the reheater 148 (or to the intermediate pressure turbine 142), or to connect the high pressure turbine 140 to the waste-heat recovery system 123.

The second steam union junction 152d is connected downstream of the reheater 148 (or of the high pressure turbine 140) and of the waste-heat recovery system 123, and upstream of the intermediate pressure turbine 142. It can be selectively adjusted to connect the reheater 148 (or the high pressure turbine 140) to the intermediate pressure turbine 142 or the waste-heat recovery system 123 to the intermediate pressure turbine 142.

Figure 2B:
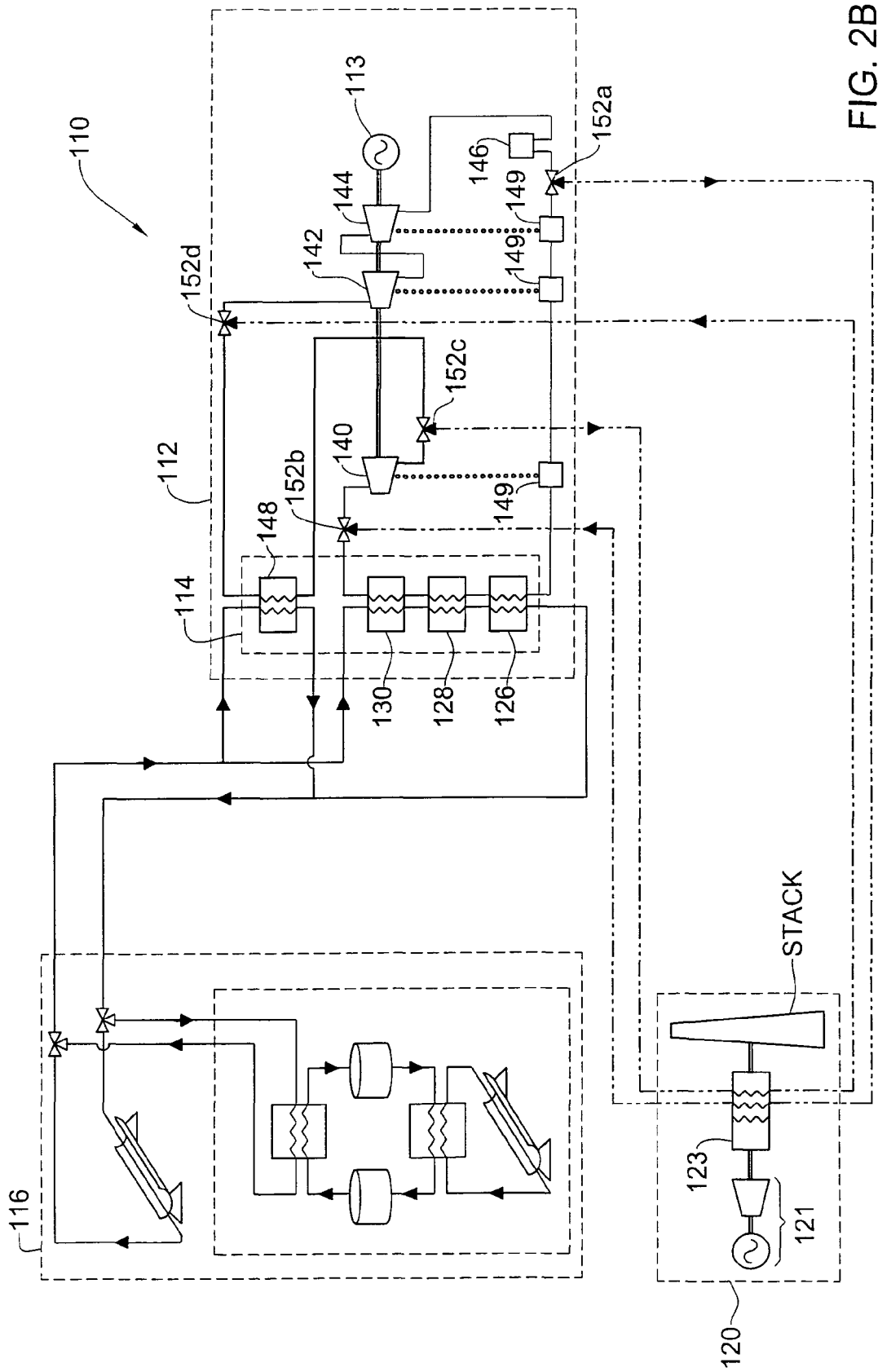
FIG. 2B is a schematic illustration of the solar thermal power plant illustrated in FIG. 2A, in a primary direct solar mode thereof.
Figure 2C:
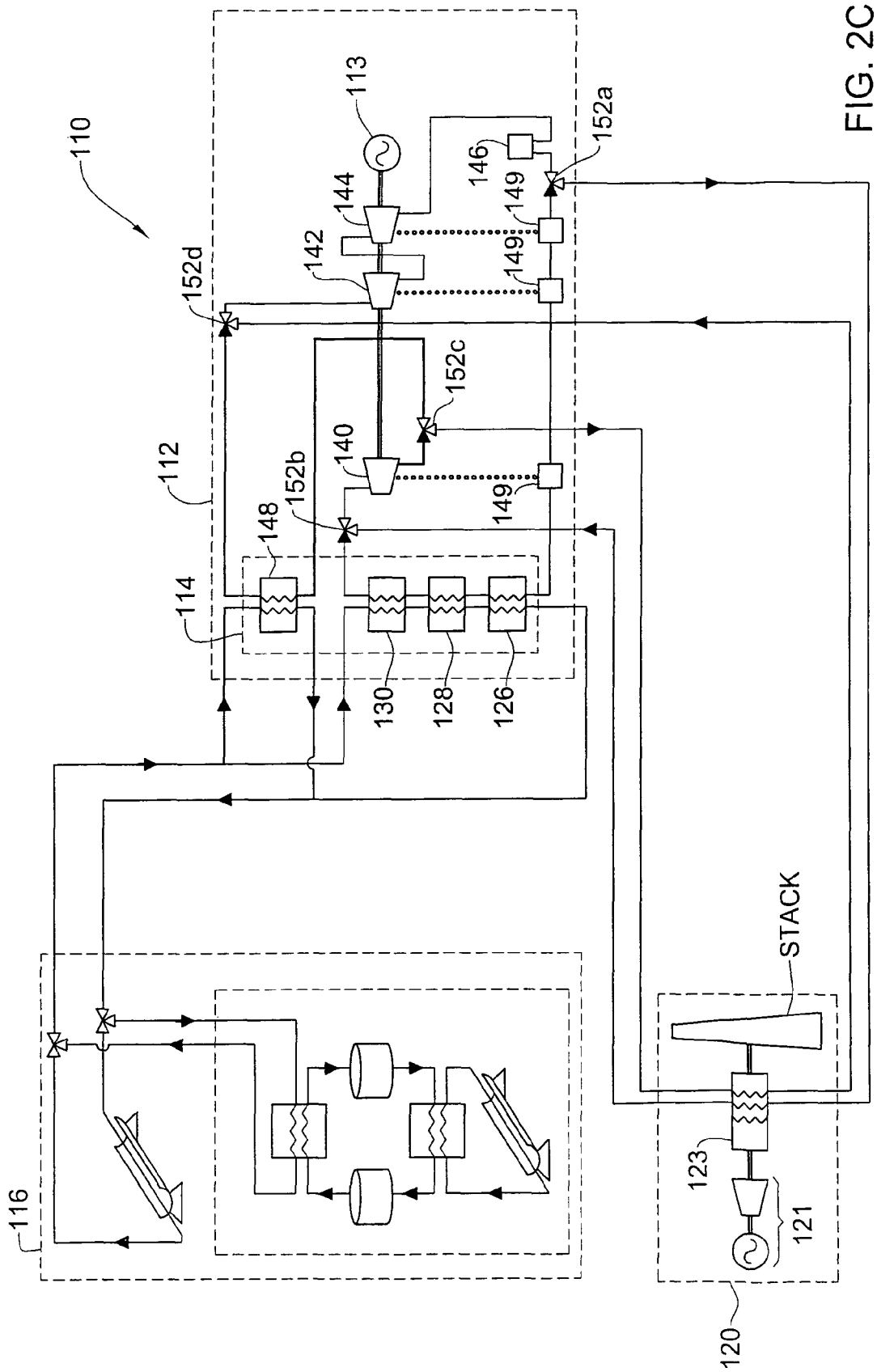
FIG. 2C is a schematic illustration of the solar thermal power plant illustrated in FIG. 2A, in a primary direct non-solar mode thereof.

The steam-electric power plant 112 is configured to operate in one of two modes:

direct solar mode, in which heated thermal fluid from the solar collection system 116 or heat storage/discharge system 118 is provided to the steam generation system 114 in order to heat the water/steam within the steam-electric power plant 112; direct solar mode may operate either in primary solar heating mode, secondary solar heating mode, or hybrid primary/secondary solar heating mode, as described above; in this mode, as illustrated in FIG. 2B, all of the steam division and steam union junctions 152a, 152b, 152c, 152d are operational to allow working fluid to remain within the working fluid circuit (operational state of each junction is indicated by the triangles in the figures—an unfilled triangle indicates an open direction of flow, and a filled triangle indicates a blocked direction of flow; blocked lines of flow are indicated as dotted lines); and direct non-solar mode, in which the non-solar power plant 120 functions to provide power, both directly, e.g., by the gas turbine thereof, and by utilizing the recovered waste heat of the gas turbine to directly heat the water/steam within the steam generation system 114 to power the steam-electric power plant 112; as illustrated in FIG. 2C, all of the steam division and steam union junctions 152a, 152b, 152c, 152d are operational to divert water/steam from the working fluid circuit to the waste-heat recovery system 123 of the non-solar power plant 120 to be heated there, and to reintroduced thereto the heated water/steam; in direct non-solar mode, the steam cycle of the steam-electric power plant 112 may run at a reduced capacity, e.g., at 30%-50%.

The above modes are presented with each steam division junction 152a, 152c operational to fully divert working fluid. However, it will be appreciated that they may be operational to only partially divert fluid as described above, leading to "hybrid" modes, wherein the steam-electric power plant 112 operates in both modes simultaneously. For example, the steam division junction 152a, 152c may be operational to divert only some working fluid to the waste-heat recovery system 123, resulting in a hybrid direct solar/direct non-solar mode. The amount that each of the steam division junction 152a, 152c diverts may differ from one another; in addition, one may be operative to divert working fluid to the waste-heat recovery system 123, and one may be operative to at least partially maintain working fluid within the working fluid circuit.

A controller (not illustrated) is provided to coordinate the operation of the junctions, as well as the other equipment of the power plant 110.

Each of the above systems may be provided with the required sensors, meters, etc. In this way, it is possible to track how much of the power generated by the power plant 110 has been provided by each of the several systems. This may be useful, for example, in demonstrating compliance with local regulations, analyzing costs, gathering detailed usage data, etc.

In addition to the examples presented above and illustrated in FIGS. 1A through 2C, a power plant may be provided configured to heat working fluid of a steam-electric power plant, as well as thermal fluid for providing heat to the steam-electric power plant, within the waste-heat recovery system of a non-solar power plant. Such a plant would comprise, inter alia, all of the elements described in the examples above.

It will be appreciated that elements described herein the specification and claims, such as turbines, heat exchangers, storage tanks, generators, controllers, etc., may be constituted by a system which performs the intended function, without departing from the spirit and scope of the present invention. For example, a heat exchanger may be constituted by several heat exchangers either in series or parallel and/or other appropriate elements, a controller may be constituted by a network of sub-controllers, etc.

Those skilled in the art to which this invention pertains will readily appreciate that numerous changes, variations and modifications can be made without departing from the scope of the invention mutatis mutandis.

The invention claimed is:

1. A solar thermal power plant, comprising:
   a steam-electric power plant associated with a steam generation system operationally connected thereto for providing heat to drive operation of the steam-electric power plant;
   a solar collection system designed to heat thermal fluid and is in communication with the steam-electric power plant to provide heat thereto for driving the operation of the steam-electric power plant; and
   a non-solar power plant comprising a power generation unit and a waste heat recovery unit; and
   a controller configured to selectively operationally connect the solar collection system and the waste heat recovery unit to the steam-electric power plant to provide heat thereto,
   wherein the steam-electric power plant is configured to selectively at least partially divert working fluid from a steam division junction, to the waste heat recovery unit for heating, and reintroduced at a corresponding steam union junction,
   wherein the steam-electric power plant including a working fluid circuit is designed for carrying the working fluid sequentially through the steam generation system, a first turbine, a second turbine operating at a lower pressure than the first turbine, and returning to the steam generation system,
   wherein a first steam division junction is located downstream of the second turbine and upstream of the steam generation system, and
   wherein a first steam union junction, corresponding to the first steam division junction, is located downstream of the steam generation system and upstream of the first turbine,
   wherein the first steam division junction and the first steam union junction is defined by a three way valve whereby the first steam division junction is configured to selectively divert working fluid in one of two directions and the first steam union junction is configured to reintroduce working fluid which had been diverted by the first steam union junction,
   wherein the solar thermal power plant is configured to selectively operate in at least one of a direct solar mode or a direct non-solar mode,
   wherein in the direct solar mode the first steam division junction operates to allow working fluid flow between the second turbine and the steam generation system, and the first steam union junction operates to allow working fluid flow between the steam generation system and the first turbine, and
   wherein in the direct non-solar mode, the first steam division junction operates to allow working fluid flow between the second turbine and the waste heat recovery unit, and the first steam union junction operates to allow working fluid flow between the waste heat recovery unit and the first turbine.

2. The solar thermal power plant according to claim 1, wherein the solar thermal power plant is configured to operate in the direct solar mode and the direct non-solar mode simultaneously.

3. The solar thermal power plant according to claim 1,
   wherein a second steam division junction is located downstream of the first turbine and upstream of the second turbine,
   wherein a second steam union junction, corresponding to the second steam division junction, is located downstream of the second steam division junction and upstream of the second turbine, and
   wherein the second steam division junction and the second steam union junction is defined by a three way valve whereby the second steam division junction is configured to selectively divert working fluid in one of two directions and the second steam union junction is configured to reintroduce working fluid which had been diverted by the second steam union junction.

4. The solar thermal power plant according to claim 3,
   wherein in the direct solar mode, the second steam division junction and second steam union junction operate to allow working fluid flow between the first turbine and the second turbine, and
   wherein in the direct non-solar mode, the second steam division junction operates to allow working fluid flow between the first turbine and the waste heat recovery unit, and the second steam union junction operates to allow working fluid flow between the waste heat recovery unit and the second turbine.

5. The solar thermal power plant according to claim 3,
   wherein the steam generation system comprises a reheater located within the working fluid circuit downstream of the first turbine and upstream of the second turbine, and wherein the reheater is located downstream of the second steam division junction and upstream of the second steam union junction.

6. The solar thermal power plant according to claim 1, further comprising a plurality of feedwater heaters located within the working fluid circuit downstream of the second turbine and upstream of the steam generation system,
wherein the first steam division junction is located upstream of the plurality of feedwater heaters.

7. The solar thermal power plant according to claim 1, wherein the solar thermal power plant is configured to selectively at least partially divert thermal fluid from an oil division junction between the solar collection system and the steam-electric power plant, to a corresponding alternate heat source for heating of the thermal fluid, and subsequently reintroduced at a corresponding oil union junction between the solar collection system and the steam-electric power plant.

8. The solar thermal power plant according to claim 7,
wherein the first oil division junction is located downstream of the steam-electric power plant and upstream of the solar collection system,
wherein a first oil union junction, corresponding to the first oil division junction, is located downstream of the solar collection system and upstream of the steam-electric power plant, and
wherein the corresponding alternate heat source is the waste heat recovery unit.

9. The solar thermal power plant according to claim 7,
wherein the solar thermal power plant is configured to selectively operate in a non-solar heating mode,
wherein the first oil division junction operates to allow thermal fluid flow between the steam-electric power plant and the waste heat recovery unit, and
wherein the first oil union junction operates to allow working fluid flow between the waste heat recovery unit and the steam-electric power plant.

10. The solar thermal power plant according to claim 1,
wherein the solar collection system further comprises a heat storage/discharge system configured for storing therein a portion of heat captured by the solar collection system, and
wherein the controller is further configured to selectively operationally connect the heat storage/discharge system to the steam-electric power plant to provide heat thereto.

11. The solar thermal power plant according to claim 10,
wherein a second oil division junction is located downstream of the steam-electric power plant and upstream of the solar collection system,
wherein a second oil union junction, corresponding to the second oil division junction, is located downstream of the solar collection system and upstream of the steam-electric power plant, and
wherein a corresponding alternate heat source is the heat storage/discharge system.

12. The solar thermal power plant according to claim 11,
wherein the solar thermal power plant is configured to selectively operate in at least one of a primary solar heating mode or a secondary solar heating mode,
wherein in the primary solar heating mode, the second oil division junction operates to allow working fluid flow between the steam-electric power plant and the solar collection system, and the second oil union junction operates to allow working fluid flow between the solar collection system and the steam-electric power plant, and
wherein in the secondary solar heating mode, the second oil division junction operates to allow thermal fluid flow between the steam-electric power plant and the heat storage/discharge system, and the second oil union junction operates to allow working fluid flow between the heat storage/discharge system and the steam-electric power plant.

13. The solar thermal power plant according to claim 12, wherein the solar thermal power plant is configured to operate in the primary solar heating mode and the secondary solar heating mode simultaneously.

14. The solar thermal power plant according to claim 13, wherein the solar thermal power plant is configured to operate simultaneously in the non-solar heating mode and in at least one of the primary solar heating mode and secondary solar heating mode.

15. The solar thermal power plant according to claim 12, wherein the solar collection system comprises a primary solar field for operational connection to the steam-electric power plant to supply heat thereto, and a secondary solar field for operational connection to the heat storage/discharge system to supply heat thereto.

16. The solar thermal power plant according to claim 12, wherein the solar collection system comprises a solar field configured to be selectively operationally connected to the steam-electric power plant and/or the heat storage/discharge system to supply heat thereto.

* * * * *